(12) United States Patent
Wei

(10) Patent No.: US 11,922,662 B2
(45) Date of Patent: Mar. 5, 2024

(54) MATCHING TWO COLOR MEASUREMENT DEVICES USING ARTIFICIAL NEURAL NETWORK

(71) Applicant: DATACOLOR INC., Lawrenceville, NJ (US)

(72) Inventor: Hong Wei, Princeton, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 447 days.

(21) Appl. No.: 17/087,279

(22) Filed: Nov. 2, 2020

(65) Prior Publication Data
US 2022/0138986 A1    May 5, 2022

(51) Int. Cl.
| | |
|---|---|
| *G06T 7/90* | (2017.01) |
| *G01J 3/46* | (2006.01) |
| *G01J 3/50* | (2006.01) |
| *G06F 3/14* | (2006.01) |
| *G06N 3/04* | (2023.01) |
| *G06N 3/08* | (2023.01) |

(52) U.S. Cl.
CPC ............... *G06T 7/90* (2017.01); *G01J 3/462* (2013.01); *G01J 3/50* (2013.01); *G06N 3/04* (2013.01); *G06N 3/08* (2013.01); *G06F 3/14* (2013.01); *G06T 2207/10024* (2013.01); *G06T 2207/20081* (2013.01); *G06T 2207/20084* (2013.01)

(58) Field of Classification Search
CPC ............. G06T 7/90; G06T 2207/10024; G06T 2207/20081; G06T 2207/20084; G06N 3/04; G06N 3/08; G01J 3/462; G01J 3/50; G06F 3/14

USPC ................................. 382/155–159, 162–167
See application file for complete search history.

(56) References Cited

U.S. PATENT DOCUMENTS

| | | | |
|---|---|---|---|
| 7,057,641 B2 | 6/2006 | Bodnar et al. | |
| 7,554,586 B1 | 6/2009 | Imai et al. | |
| 8,279,440 B2 | 10/2012 | Frick et al. | |
| 10,057,549 B2 | 8/2018 | Yu et al. | |
| 10,346,710 B2 | 7/2019 | Nu | |
| 10,502,628 B1 | 12/2019 | Park et al. | |
| 10,643,099 B2 * | 5/2020 | Xu | G06V 10/82 |
| 2002/0106121 A1 * | 8/2002 | McClanahan | G06T 7/90 |
| | | | 382/156 |

(Continued)

FOREIGN PATENT DOCUMENTS

CN          101588505 A   * 11/2009

*Primary Examiner* — Kenny A Cese
(74) *Attorney, Agent, or Firm* — LEASON ELLIS LLP

(57) ABSTRACT

In one or more implementations, the apparatus, systems and methods disclosed herein are directed to configuring a color measurement device to output color measurements that match the expected output of a different color measurement device. In a particular implementation, a method is provided for matching the color measurements made by a color measurement device to the color measurements made by a target color measurement device by implementing a single step color calibration and conversion process using an Artificial Neural Network (ANN). By way of non-limiting example, the raw counts from the color measurement device is converted to a specific color space, such as L*a*b, directly through an ANN. Such ANN is trained to ensure the output of the color measurement from the color measurement device will match with the output of the color measurement from a target color measurement device.

16 Claims, 9 Drawing Sheets

(56) References Cited

U.S. PATENT DOCUMENTS

2019/0279023 A1* 9/2019 Xu .................... G06V 10/56
2020/0225778 A1 7/2020 Lewty et al.
2022/0058835 A1* 2/2022 Walters .................. G06T 9/002

* cited by examiner

MATCHING TWO COLOR MEASUREMENT DEVICES USING ARTIFICIAL NEURAL NETWORK

FIELD OF THE DISCLOSURE

The present invention generally relates to the measurement of color, and more specifically relates to color lookup using a smart phone.

BACKGROUND

Many industries, including textiles, coatings, and the like, rely on color matching. Color matching may involve identifying a target color (e.g., from an object or from a known standard) and subsequently reproducing the target color in a color mixture, i.e., so that any visual difference between the color mixture and the target color is minimized. For instance, a customer may ask for a can of paint to be mixed in a color that matches the color of a wall in the customer's home, so that touch-ups to the wall can be made in a manner that "blends in." Similarly, an automobile manufacturer may ask that a coating be mixed in a color that matches the color of existing automobiles built by the manufacturer, in order to ensure color consistency across the manufacturer's line.

There exists in the field of color management and matching, a number of approaches to identifying the color of a sample and matching that identified color to a standardized set of colors, such as a color supplier's product offerings. For example, U.S. Pat. No. 7,057,641 B2 'Method for Using an Electronic Imaging Device to Measure Color'; U.S. Pat. No. 7,554,586 B1 'System and Method for Scene Image Acquisition and Spectral Estimation Using a Wide-Band Multi-Channel Image Capture'; U.S. Pat. No. 8,279,440 B2 "Hand-Held Light Measuring Device"; U.S. Pat. No. 10,057,549 "Computer-implemented system and method for color sensing, storage and comparison"; U.S. Pat. No. 2020/0225778 A1 "Computer System with Color sampling Stylus"; U.S. Pat. No. 10,502,628 B1 "Inter-Instrument Variation Correction"; U.S. Pat. No. 10,346,710 "Multi-Agent Training of a Color Identification Neural Network"; U.S. Pat. No. 10,643,099 "Multi-Agent Training of a Color Identification Neural Network" and Method and apparatus for color lookup using a mobile device", U.S. patent application Ser. No. 16/591,088, all of which are incorporated by reference as if presented herein in their respective entireties. Likewise, there exists commercial products that permit users to sample colors, and then match those colors to a given color supplier's product offerings, for example, Nix color sensor https://www.nixsensor.com/; Variable Color Muse https://colormuse.io/; Datacolor ColorReader http://www.colorreader.datacolor.com/us/; X-Rite ColorEye https://www.xrite.com/categories/color-matching-apps/coloreye each provide apparatus and systems for evaluating color from color samples and then matching those colors to a pre-defined color set.

While some approaches currently use neural networks or other machine learning approaches to improve the performance of the color matching approach, the present state of the art still suffers from a number of drawbacks. The current approaches require in-depth training data sets to obtain suitably robust ANN models in order to provide accurate color measurement results.

SUMMARY

In one or more implementations, the apparatus, systems and methods disclosed herein are directed to configuring a color measurement device to output color measurements that match the expected output of a different color measurement device. In a particular implementation, a method is provided for matching the color measurements made by a color measurement device to the color measurements made by a second color measurement device by implementing a single step color calibration and conversion process using an Artificial Neural Network (ANN). By way of non-limiting example, the raw counts from the first color measurement device is converted to a specific color space, such as L*a*b, directly through an ANN. Such ANN is trained to ensure the output of the color measurement from the first color measurement device will match with the output of the color measurement from a second color measurement device. The second color measurement device can be the same model or different type as the first color measurement device.

In one particular implementation, a color identification system for identifying a color of a sample object is provided. The color identification system includes an image capture device configured to acquire an image of sample and a processor having memory configured by program code executed. The processor is configured to extract from a pre-defined portion of the image, RGB values of the pixels depicting the pre-defined portion and apply the RGB values as inputs to a pre-trained artificial neural network, the artificial neural network having an at least an input and an output layer, wherein the output layer is configured to output color values in a pre-determined color space. The processor is further configured to generate, using the artificial neural network, an output in the predetermined color space values characterizing the one or more color values of the sample in response to being provided the RGB values and provide the output to one or more display devices.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

Figure 1:
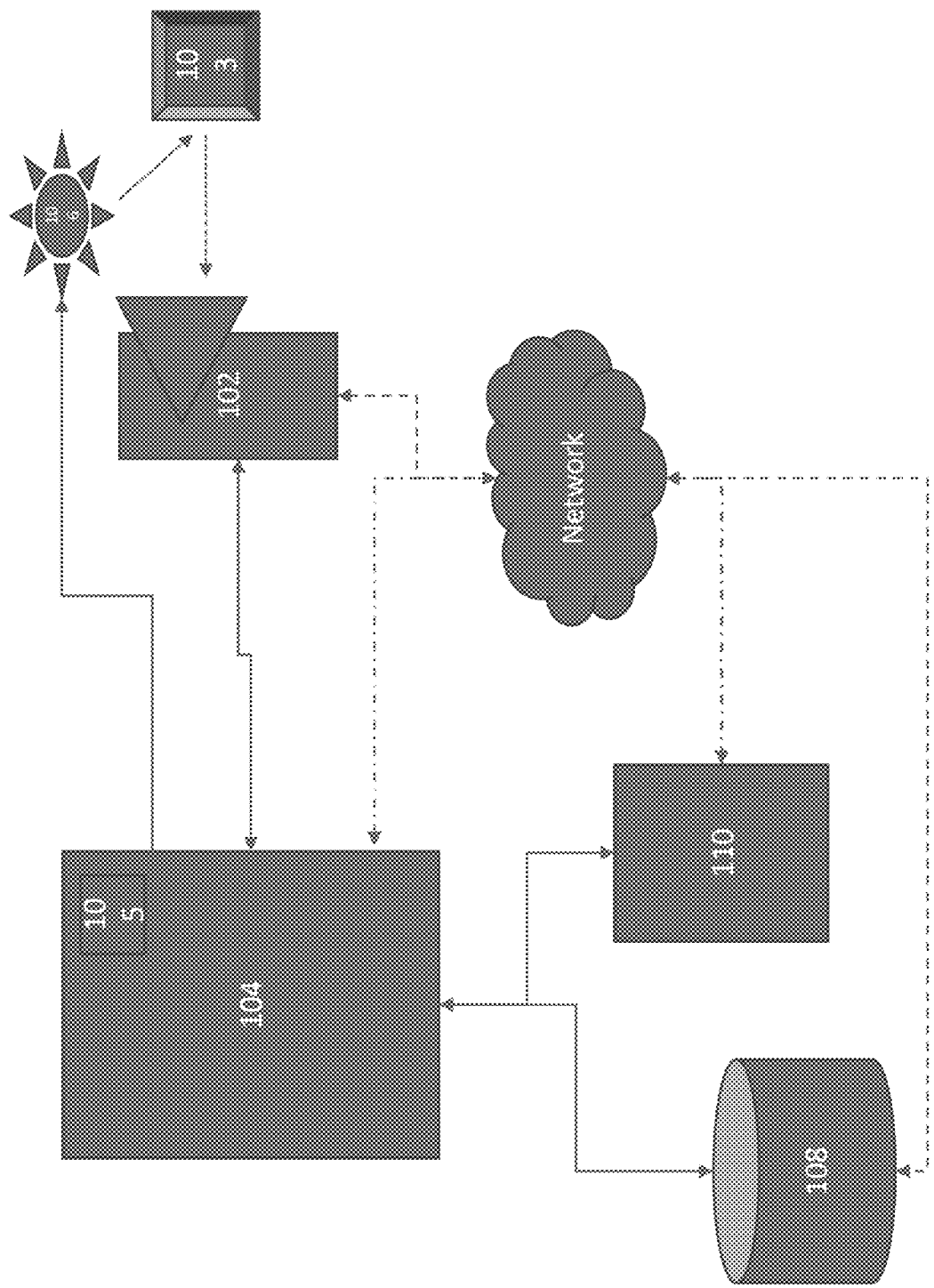
FIG. 1 provides the devices and components of a color measurement system that interface over one or more data communication networks in accordance with one or more implementations of the present application.

By way of overview and introduction, the apparatus, systems and methods described are directed to matching the output of a color measurement device when measuring a sample to the expected output of a second color measurement device that is used to measure the same sample. In a particular configuration, by combining the device color calibration and Artificial Neural Network (ANN) into one single step. The raw counts from the color measurement device is converted to a specific color space, such as L*a*b, directly through an ANN. Such ANN is trained to ensure the output of the color measurement from the first color measurement device will match with the output of the color measurement from a second color measurement device. The second color measurement device can be the same model or different type as the first color measurement device.

In currently described approaches, such as in co-owned U.S. Pat. No. 10,502,628 (herein incorporated by reference), the output of different color measurement devices are matched by adjusting the color output of the first device through some linear or nonlinear fitting process. As described in U.S. Pat. No. 10,502,628, the original color output of the first color measurement device is generated by a separate color calibration process that converts the raw counts from the color sensors to the desired color output in certain color space, such as Lab and LCH. This color space output is then converted or transformed using a machine learning model to match the expected output of a second device measuring the same sample.

As provided in more detail herein, the apparatus, systems and methods described are configured to directly map the raw counts from the color sensors in one or more first color measurement devices to the color spaces, such Lab or LCH, of one or more second color measurement devices. By way of non-limiting example, in one application of the described approach, the color measurements made using a smart phone can be matched to the color measurements made by an existing colorimeter. More specifically, the presently described systems, apparatus and methods are directed to using raw measurement data obtained by a smartphone and directly converting that raw data into color space values that match the expected output of a colorimeter.

The general approach to using smartphone cameras to match color values is described in more detail in co-pending U.S. patent application Ser. No. 16/591,088. There, matching the smart phone measurements to measurements obtained from an existing colorimeter simplifies the overall color matching process. For example, such an approach eliminates multiple color databases needed to do intermediate color matching, such that one a single "universal" color database for varieties of color measurement instruments is needed. The presently described systems, apparatus and methods are likewise directed to improvements in color matching functionality while also simplifying the operational complexity of the color matching process.

Referring now to the drawings, in which like references numerals refer to like elements, FIG. 1 illustrates devices and components for obtaining color measurement data that interface over one or more data communication networks in accordance with one or more implementations of the present application. As shown, FIG. 1 illustrates a sample 103 under analysis by color measurement device 102, or sensor thereof. Here, the sample 103 can be any type or form of physical article having color or spectral properties in need of analysis. In one implementation, the sample 103 is sample of a material under production having reflective or transmissive properties. For instance, the sample 103 is a fabric sample, such as fleece or fabric blends. In another implementation, the sample 103 is a sheet of translucent or semi-translucent material. In yet a further implementation, the sample 103 is an object or item integral to a larger structure or item, such as a dashboard of an automobile, or a section of wall of a structure. For example, the sample 103 is a section or portion of stucco, carpe, building materials, housing, chassis, packaging, or another item.

With continued reference to FIG. 1, the color sample 103 is placed such that the color sample 103 can be illuminated by at least one (1) illuminant 106. For instance, the illuminant 106 is configurable to produce a light with certain spectral power distributions. For instance, the illuminant 106 includes one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one arrangement, illuminant 106 is a broad-band LED. In one or more implementations, the illuminant 106 includes a lens, filter, screen, enclosure, or other elements (not shown) that are utilized in combination with the light source of the illuminant 106 to direct a beam of illumination, at a given wavelengths, to the sample 103.

In one implementation, the illuminant 106 is operable or configurable by an internal processor or other control circuit. Alternatively, the illuminant 106 is operable or configurable by a remote processor or control device having one or more linkages or connections to the illuminant 106. As shown in FIG. 1, the illuminant 106 are directly connected to a color measurement device 10.

As further shown in FIG. 1, the illuminant 106 is positioned relative to the sample 103 and color measurement device 102 so as to provide a 45/0, d/8, or other illumination/pickup geometry combination. Where the sample 103 is a transmissive sample, however, the orientation of the illuminant 106 relative to the sample 103 and the color measurement device 102 is such that the light beam is directed though the sample 103 to the color measurement device 102.

Continuing with FIG. 1, light reflected (or in the case of a transmissive sample, transmitted) upon the sample 103 is captured or measured by a color measurement device 102. Here, the color measurement device 102 can be a color sensor or image capture device. For example, the color measurement device 102 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof.

In a particular implementation, the color measurement device 102 is configured to generate an output signal upon light being striking the color measurement device 102 or a light sensing portion thereof. By way of non-limiting example, the color measurement device 102 is configured to output a signal in response to light that has been reflected off of the sample striking a light sensor or other sensor element integral or associated with the color measurement device 102. For instance, the color measurement device 102 is configured to generate a digital or analog signal that corresponds to the wavelength or wavelengths of light that a light sensor integral to the color measurement device 102 after being reflected off of the sample 103. In one or more configurations, the color measurement device 102 is configured to output spectral information, RGB information, or another form of multi-wavelength data representative of light reflected off, or transmitted through, the sample 103.

In one or more implementations, the color measurement device 102 the camera component of a smartphone, tablet or other portable communication device. Alternatively, the color measurement 102 is a standalone color measurement device that is configured to output data to one or more remote processors or computers.

In one non-limiting implementation, the color measurement device 102 is a camera or image recording device integrated into a smartphone, tablet, cell phone, or other portable computing apparatus. In a further embodiment, the color measurement device 102 is an "off the shelf" digital camera or web-camera connected or in communication with one or more computing devices.

The color measurement device 102, in accordance with one embodiment, is a stand-alone device capable of storing local data corresponding to measurements made of the sample 103 within an integrated or removable memory. In an alternative implementation, the color measurement device 102 is configured to transmit one or more measurements to a remote storage device or processing platform, such as processor 104. In configurations calling for remote storage of image data, the color measurement device 102 is equipped or configured with network interfaces or protocols usable to communicate over a network, such as the internet.

Alternatively, the color measurement device 102 is connected to one or more computers or processors, such as processor 104, using standard interfaces such as USB, FIREWIRE, Wi-Fi, Bluetooth, and other wired or wireless communication technologies suitable for the transmission measurement data.

The output signal generated by the color measurement device 102 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software in the memory 205 of the processor 104. Modules also include hardware elements substantially as described below. In one implementation, the processor 104 is located within the same device as the color measurement device 102. However, in another implementation, the processor 104 is remote or separate from the color measurement device 102.

In one configuration, the processor 104 is configured through one or more software modules to generate, calculate, process, output or otherwise manipulate the output signal generated by the color measurement device 102.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 102 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1 is configured to communicate with one another through one or more direct connections, such as through a common bus. Alternatively, each element is configured to communicate with the others through network connections or interfaces, such as a local area network LAN or data cable connection. In an alternative implementation, the color measurement device 102, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and or color measurement device 102.

In one arrangement, the processor 104 communicates with a local or remote display device 110 to transmit, displaying or exchange data. In one arrangement, the display device 110 and processor 104 are incorporated into a single form factor, such as a color measurement device that includes an integrated display device. In an alternative configuration, the display device is a remote computing platform such as a smartphone or computer that is configured with software to receive data generated and accessed by the processor 104. For example, the processor is configured to send and receive data and instructions from a processor(s) of a remote computing device. This remote computing device 110 includes one or more display devices configured to display data obtained from the processor 104. Furthermore, the display device 110 is also configured to send instructions to the processor 104. For example, where the processor 104 and the display device are wirelessly linked using a wireless protocol, instructions can be entered into the display device that are executed by the processor. The display device 110 includes one or more associated input devices and/or hardware (not shown) that allow a user to access information, and to send commands and/or instructions to the processor 104 and the color measurement device 102. In one or more implementations, the display device 110 can include a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Figure 2:
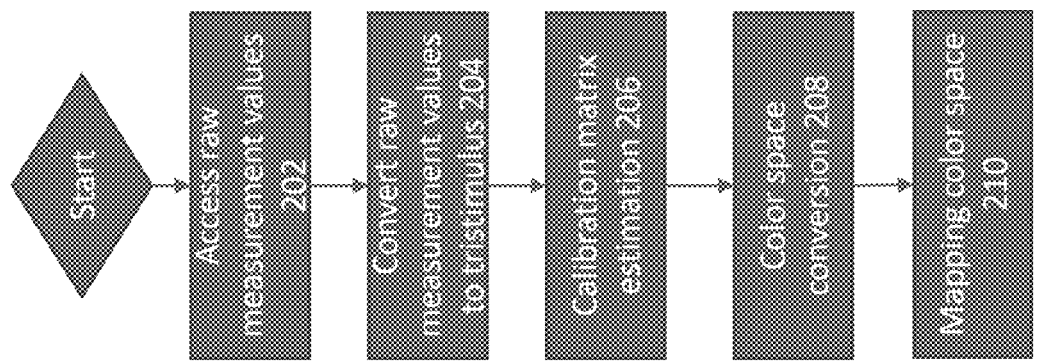
FIG. 2 provides a flow diagram detailing the ANN based color space correction according to one implementation of the color measurement system described.
Figure 3:
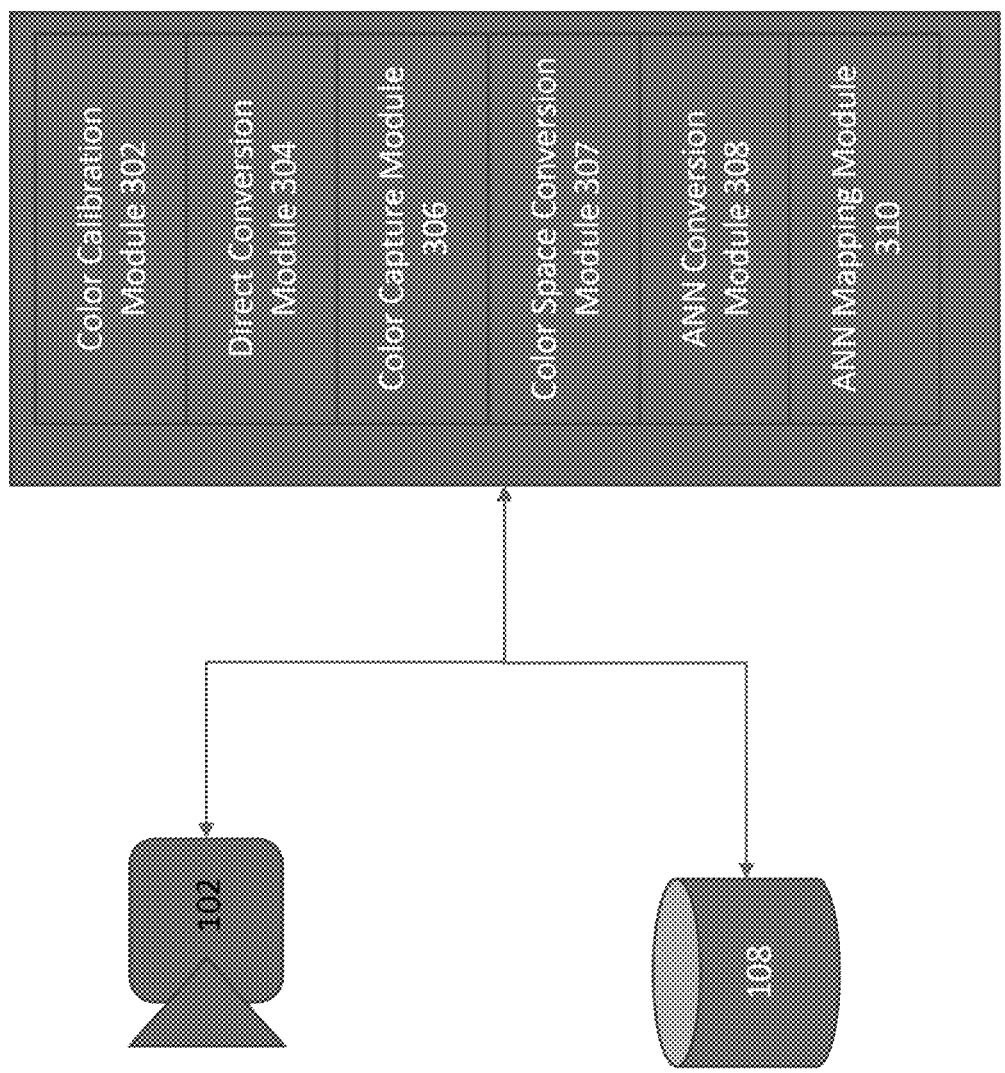
FIG. 3 provides a module diagram of the measurement system according to one embodiment configuration of the present invention.

As mentioned, the existing approaches to color matching the output of one device to another device include color calibrating the measurement device. Turning now to the flow diagram of FIG. 2 and the module diagram of FIG. 3, a color measurement device, such as a smartphone or other image capture device, can be color calibrated by first evaluating the raw measurement data to a desired color space. From there, the color space values are adjusted to match the color space values expected to be output by the second, or target, measurement device. By way of example, a color calibration module 302 configures a processor (such as but not limited to processor 104) to implement a color calibration process.

For example, one or more submodules of the color calibration module 302 configures a processor 104 to receive raw measurement values from a camera or color measurement device as in step 202. For instance, where the color measurement device 102 is a smartphone or camera thereof, a processor is configured to define the raw counts extracted from each color sensor as D, where D can be represented by:

$$D = \begin{bmatrix} d_1 \\ d_2 \\ \vdots \\ d_n \end{bmatrix} \quad \text{(Eq. 1)}$$

By way of example only, here n is the number of the color sensors utilized by the color measurement device 102. By way of further example, in a traditional colorimeter or a camera based colorimeter there are usually three discrete color sensors that cover the Red, Green, and Blue channels respectively. Thus, in that specific case, n will equal to 3. However, those possessing an ordinary level of skill in the requisite art will appreciate that other values for n are envisioned and understood.

Using the data values obtained in step 202, a processor is further configured by one or more submodules of the color calibration module 302 to convert the raw sensor measurements into color tristimulus values as in conversion step 204. For example, the one or more submodules of the color calibration module 302 configures the processor (such as processor 104) to calculate the color tristimulus values, as defined as RT=[$\bar{X}$, $\bar{Y}$, $\bar{Z}$]$^T$, which can be calculated as $$\begin{bmatrix} \bar{X} \\ \bar{Y} \\ \bar{Z} \end{bmatrix} = M_A \times \begin{bmatrix} D \\ 1 \end{bmatrix} \quad \text{(Eq. 2)}$$

Where $M_A$ is a 3×(n+1) color calibration matrix that convert the raw counts (n×1) to the color tristimulus values (3×1). $M_A$ is generated from the color calibration process.

By way of further explanation, a set of training colors with known color tristimulus values can be measured by the color measurement device 102. The raw counts (unprocessed measurement outputs) from all the training colors can be combined into a n×m matrix (D), where n is the number of color sensors equipped and m is the number of the training colors.

However, in order to evaluate the measurements, a 3×m matrix $R_T$ that contains the known color tristimulus values of the m training colors with pre-determined standard illuminant and CIE color match function is also needed. The known color tristimulus values of the m training colors can be obtained by measuring these training colors with a master instrument. In one particular implementation, such a master instrument is the same instrument as the color measurement device 102. However, in alternative implementations, the master instrument is a different make and model from the color measurement device 102. For example, the master instrument used can be a color measurement device having greater precision or fidelity than the color measurement device is capable.

In more detail, the color calibration matrix $M_A$ is generated by estimating the 3×n matrix M and the offset 1×m vector b that map (as closely as possible) the raw count matrix D to the corresponding color tristimulus values matrix RT by:

$$R_T = MD + b. \quad \text{(Eq. 3)}$$

Eq. 3 can be further expressed as a homogeneous equation:

$$R_T = M_A D_A, \quad \text{(Eq. 4)}$$

where $M_A$=[M b] is the 3×(n+1) matrix comprising M right-augmented by the column vector b, and $D_A$=[D' 1']' is the (n+1)×m matrix comprising D augmented from the bottom by a row m-vector 1 of 1's. Here, D' is the transpose of D.

In one or more implementations, a color matrix estimation submodule of the color calibration module 302 configures a processor (such as but not limited to processor 104) to estimate $M_A$, using a least-square approximation. For example, as shown in estimation step 206, the processor 104 is configured to estimate $M_A$ according to:

$$M_A = R_T \text{pinv}(D_A) = R_T D_A'(D_A D_A')^{-1}. \quad \text{(Eq. 5)}$$

Once estimation of Eq. 5 is carried out, the conversion from raw counts to the color tristimulus values can be conduct by using Eq. 2. The calculated color tristimulus values [X Y Z] can then be further converted to other color spaces, such as Lab and LCH. For example, a color conversion step 208 is implemented by a processor configured by one or more submodules of the color calibration module 302 that causes the processor 104 to covert the tristimulus values using a color space conversion algorithm that takes tristimulus data as an input and outputs color data in the desired color space.

Once the color output of the first measurement device 102 has been obtained, as in color conversion step 208, the processor 104 is then configured to map the color output of the color measurement device 102 to the color output of a different, or target, color measurement device. For example, a mapping step 210 is implemented by a processor to match the color space values output in color conversion step 208 to the expected color space values generated by a target color measurement device when such a device is used to measure the same sample measured by the color measurement device 102.

In one configuration, the mapping step 210 is implemented using an Artificial Neural Network (ANN) to convert the color output, such as Lab or LCH, from the color measurement device 102 (as obtained in color conversion step 208) to the expected color output from a second color measurement device. As noted, in one or more particular configurations the color measurement device 102 and the target color measurement device are two units of the same make and model of color measurement device. For example, both the color measurement device 102 and the target color measurement device are both the same make and model of smartphone. In an alternative configuration, the color measurement device 102 and target color measurement device are two different models from different manufactures or the same manufacturer.

In one arrangement, the ANN is trained using color measurements obtained from the color measurement device 102. For example, the L*a*b* values obtained by the color measurement device 102 when measuring a training set of colors are provided as an input set (noted as $L^I$, $a^I$, $b^I$ in FIG. 4) of an ANN as shown in 403. The dimension of the input data is m×3, where the m represents the number of training colors. For example, the color measurement device 102 is used to measure the colors of an NCS color fan deck as the training color set. In this arrangement, the value for m will be equal to 1950 as there are total of 1950 colors in the NCS deck. In the case, the input data will be a 1950×3 matrix.

Likewise, the output data 405 will have the same size of as of m×3 or 1950×3 if NCS fan deck is used as the training colors. In one particular implementation, the mapping module 310 configures the processor 104 to process the input data though a ANN. For example, the processor 104 is configured by the mapping module 310 to propagate the input data through the ANN with randomly initialized parameters and result in the output data 405 (noted as $L^O$, $a^O$, $b^O$ in FIG. 4).

In a further step, the output data 405 is compared with the target data set 407 (noted as $L^T$, $a^T$, $b^T$ in FIG. 4), which are the L*a*b* output, in the same m×3 dimensions, of the target color measurement device when the same training color set is measured.

Figure 4:
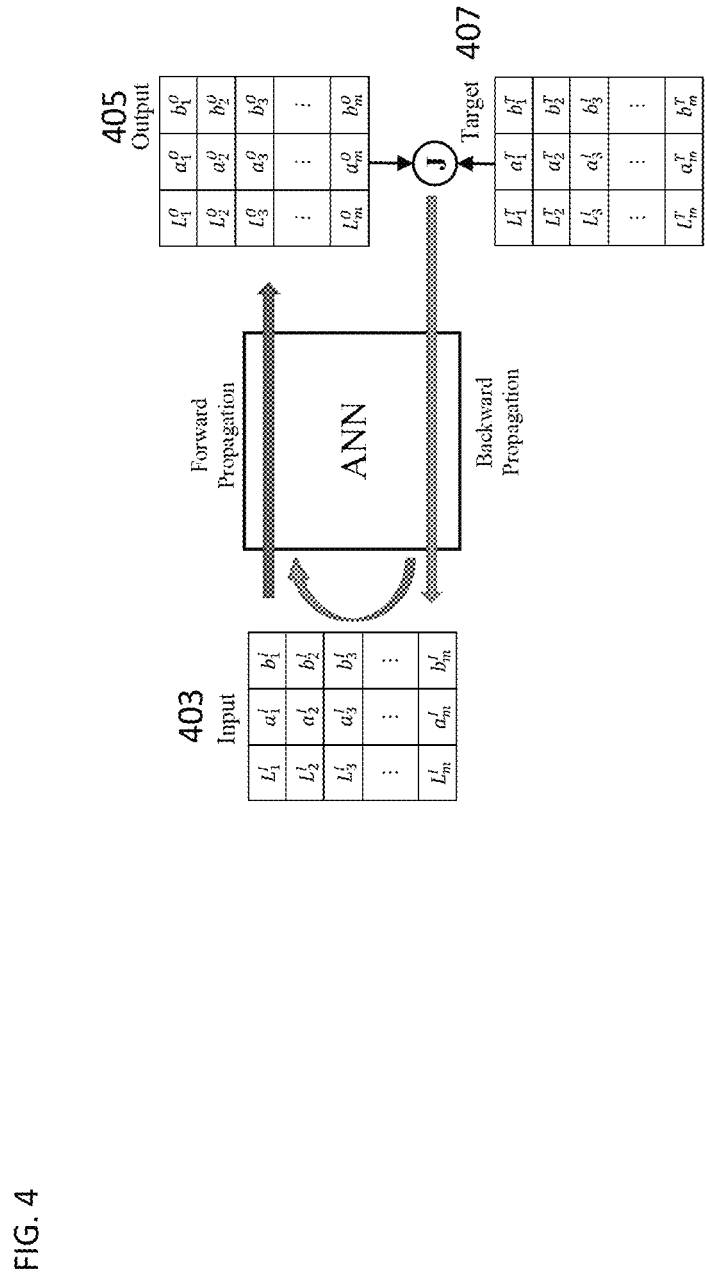
FIG. 4 is a graph detailing the ANN process according to one implementation of the color measurement system described.

In a further configuration, the mapping module 310 configures the processor 104 to evaluate the difference between the output data 405 and the target data 407 to train the ANN. The difference between the target data set 407 and the output data 405 is defined as Cost Function J as shown in FIG. 4. As a further sub-step of the ANN training process, the mapping module 310 configures the processor 104 to feed the cost function J backward into the ANN in order to optimize the parameters of the ANN to minimize the cost function J (such that the difference between the output data 405 and the target data set 407 is minimized). This process is often called the backward propagation of the ANN. In one particular implementation, the mapping module 310 configures the processor 104 to repeat the process of forward propagation and backward propagation until the minimum J is determined. For example, the mapping module 310 configures the processor 104 to adjust the parameters inside the ANN until the lowest value of J is obtained.

It will be appreciated that there are many techniques to define and minimize the cost function J. For example, one approach is to configure the processor 104 by the mapping module 310 to implement logistic regression with the cost function J as defined in Eq. 6, where m is the number of training set. $\mathcal{L}$ is the lost function defining the difference between the predicted values from the network ($\hat{y}(i)$) and the target or the ground truth value (y(i)) for a particular training set (i). The average of the lost function $\mathcal{L}$ over m training sample sets gives the cost function J. In the example provided herein, $\hat{y}(i)$ is the output ($L^O$, $a^O$, $b^O$ from the network, while y(i) is the target ($L^T$, $a^T$, $b^T$) of the training colors.

$$J = \frac{1}{m} \sum_{i=1}^{m} \mathcal{L}(\hat{y}^{(i)}, y^{(i)}) = \quad \text{(Eq. 6)}$$
$$-\frac{1}{m} \sum_{i=1}^{m} y^{(i)} \log \hat{y}^{(i)} + (1 - y^{(i)}) \log(1 - \hat{y}^{(i)})$$

Once the processor 104, configured by the mapping module 310, has obtained the lowest value for J, the ANN is considered trained with optimized parameters that can best match the input data obtained from the color measurement device 102 to the target data that corresponds to the data obtained by the target color measurement device. After training described herein, the ANN can be stored for later retrieval and use.

Figure 5:
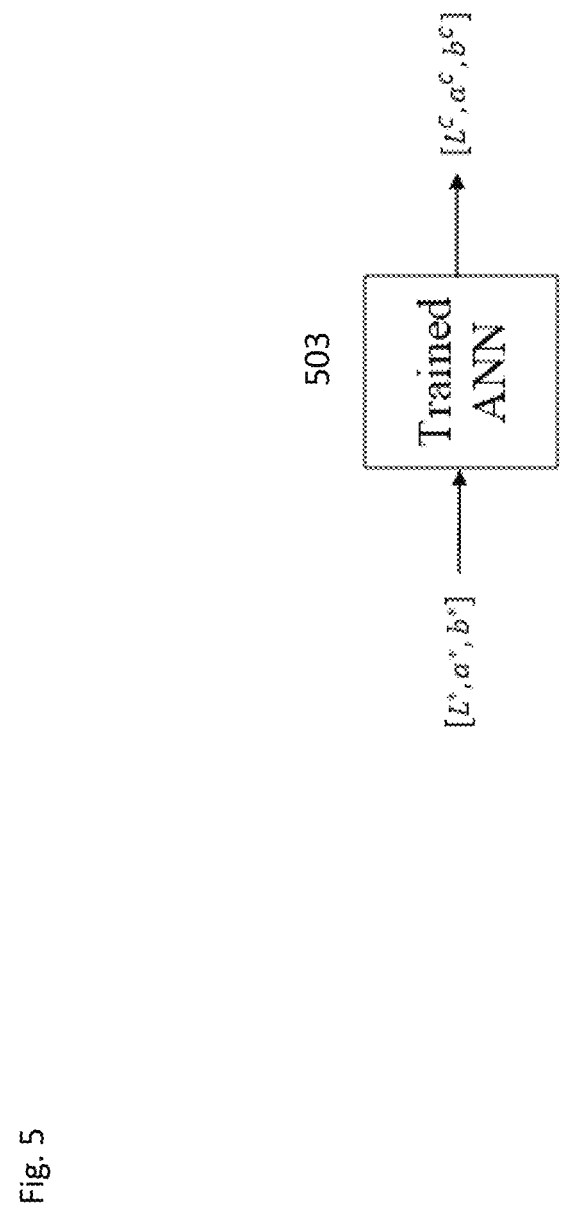
FIG. 5 is a flow diagram detailing using an ANN to generate color measurement values according to one implementation of the color measurement system described.
Figure 6:
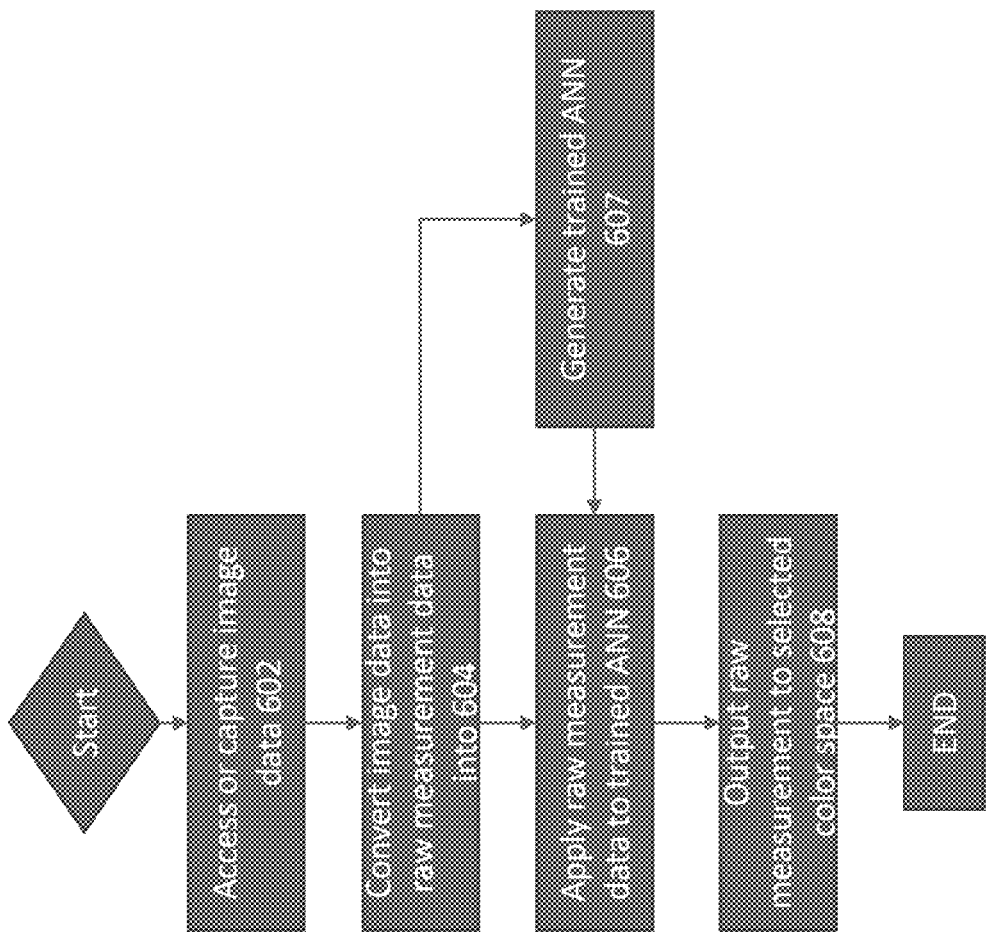
FIG. 6 is a flow diagram detailing a process of obtaining color measurements for a sample according to one implementation of the color measurement system described.

For example, a data set obtained from the color measurement device 102 can be applied to the stored trained ANN 503 so as to convert the dataset to match the results that would be expected from the second color measurement device used to train the ANN, as shown in FIG. 5.

However, as noted, the process described in steps 202-210 and FIGS. 4-5 involves first converting the raw measurement data obtained by color measurement device 102 into color space data using a color calibration process. As described in more detail herein, it has been found that it the raw data obtained from the color measurement device 102 can be fed directly into the ANN. Here, the raw data is converted by the ANN such a color space output provided by the ANN matches the expected output of a target color measurement device. For example, and in no way limiting, a processor is configured to apply the raw color data obtained from the image sensor or camera of a smartphone, when measuring a sample, to the ANN and the ANN outputs the color space values (such as L*a*b* values) for the sample 103 that matches the color space values output by a colorimeter when measuring the same sample.

Such a direct conversion process can be more readily understood with reference to FIGS. 6-9. As shown in the flow diagram of FIG. 6, a measurement capture event is triggered from a color measurement device 102, such as smartphone. For example, as shown in step 602, a processor 104 of a smartphone is configured by a color capture module 306 to capture one or more images of a sample 103. In one particular implementation, the processor 104 is triggered to capture an image in response to a user input. For example, step 602 includes circumstances where a user interacts with a hardware or software button. Such an interaction is interpreted by the processor 104 as a trigger to capture data from a color measurement device 102 connected thereto. In one arrangement, the processor 104 is configured to receive raw data from a color measurement device 102, such as image or video data obtained from an integrated video camera or still camera. For example, where the processor 104 and the color measurement device 102 are integrated into a smartphone or other mobile computing device, the processor 104 is configured by a software application operating on a processor of the smartphone to activate an illuminate 106 and obtain an image of the sample 103 under such illumination.

In another configuration, the color capture module 306 configures a processor 104 to communicate with a remote color measurement device 102. For example, where the color measurement device 102 is a stand-alone device that is separate from the processor 104, the processor 104 is configured by the color capture module 306 to exchange data with the color measurement device 102 such that measurements made by the color measurement device 102 are transmitted or exchanged with the processor 104. For example, the processor 104 is able to communicate and exchange data with the processor 104 over a wireless connection. In one implementation, the processor is configured to communicate over of more wireless protocols, such as but not limited to a Bluetooth, with the color measurement device 102. In yet a further implementation, the color capture module 306 configures the processor 104 to communicate with a color measurement device 102 that is linked via a network connection. For example, in one or more implementations, the processor 104 provided herein is a remote computer, cloud computer or server that is configured to communicate with a smartphone or other mobile device that includes a color measurement device 102. In this configuration, the data obtained by the camera or image capture device of the smartphone is transmitted to a processor 104 remote from the color measurement device 102 for evaluation and analysis.

In one particular implementation, the color capture module 306 configures a processor (such as but not limited to processor 104) to evaluate the data obtained from the color measurement device 102. For example, where the color measurement device 102 is an image capture device of a smartphone, the processor 104 is configured to evaluate the color values of the image.

Where the smartphone provides a user interface display to a user, the user interface may display a live or current view of the video data created by the color measurement device 102. The user interface then indicates a portion of that video feed that will be averaged over. Thus, a user is instructed to frame the sample 103 within the pre-determined region.

It will be appreciated that color capture and analysis has been described in co-owned U.S. Pat. Nos. 10,346,710 and 10,643,099. However, it will be appreciated that the foregoing disclosure provided does not require a reference color card that needs to be captured in the same picture as the sample 103. It has been found by the inventors that removing the reference color card allows for accurate and consistent color measurement using a smartphone or other mobile computing device without any additional hardware, such as the reference color card.

In one particular implementation, the color measurement device 102 is provided within a pre-determined distance from the sample 103. For example, and more fully described in co-pending application Ser. No. 16/591,088, the color measurement device 102 (such as one incorporated into a smartphone) is positioned close to the sample 103. By providing a controlled distance and an illuminant 106 in the form of the smartphone flash, a consistent light and measurement geometry is established that optimizes the measurement consistency and accuracy of a particular sample.

By way of further detail, step 604 also includes configuring processor 104, by a color capture module 306 or a submodule thereof, to retrieve raw counts values from the averaged over pre-determined region. For example, because a typical digital camera has three color channels, red, green, and blue, the processor 104 is configurable to generate the raw count values for these three channels for over the predefined region. In one arrangement, the color capture module 306 configures the processor 104 to average a predefined region over the image captured as in step 604. Here, a pre-defined region can be a portion of the image captured by the color measurement device 102. For example, the red, green and blue signal values for the pixels inside the pre-defined area are averaged and output as the raw color values for the sample.

Figure 7:
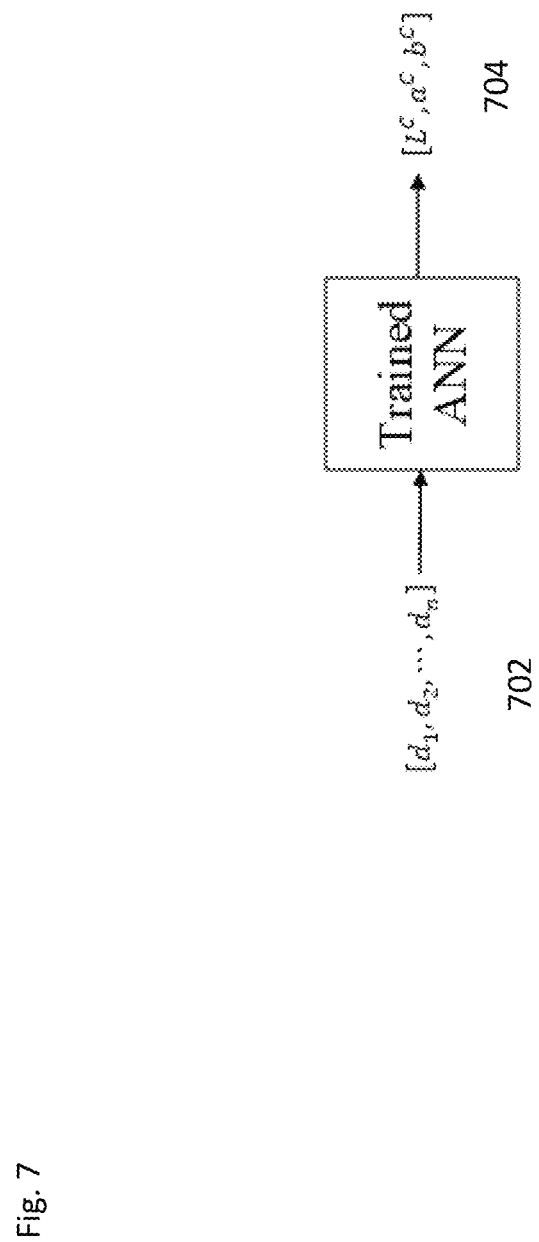
FIG. 7 is a flow diagram detailing using an ANN to generate color measurement values according to one implementation of the color measurement system described.

Once these values have been generated, the color values obtained by the processor 104 can be applied directly to the ANN as in step 606. Here, the ANN, as shown in FIG. 7, takes the color values obtained from the image in step 604 (input data 702) and generates output values (output values 704) in a particular color space. For example, ANN provided in FIG. 7 is configured to generate L*a*b* values from the raw input data provided in step 604. It will be appreciated that the output data 704 of the ANN is substantially similar to the expected output of a target color measurement device. For example, the ANN is trained to output measurements similar to a colorimeter, such as the Datacolor ColorReader in response to raw measurement data from the image. Once generated, the output data is stored for further use as in step 608.

In one or more implementations, the ANN has not yet been trained to evaluate the raw data measurements obtained in step 604. As a result, a new trained ANN is generated as shown in step 607. In one or more configurations the ANN is configured to output color values matching the expected output of a different or alternative color measurement device. For example, the output of the ANN is trained such that the input data is matched to the expected measurement of a sample by a different make or model of smartphone. Likewise, the ANN can be trained so as to output values that are matched to the expected output values of the same make and model of smartphone. For example, the ANN could be configured to output color values expected of a smartphone that implements the color calibration steps as provided in 202-204.

Figure 8:
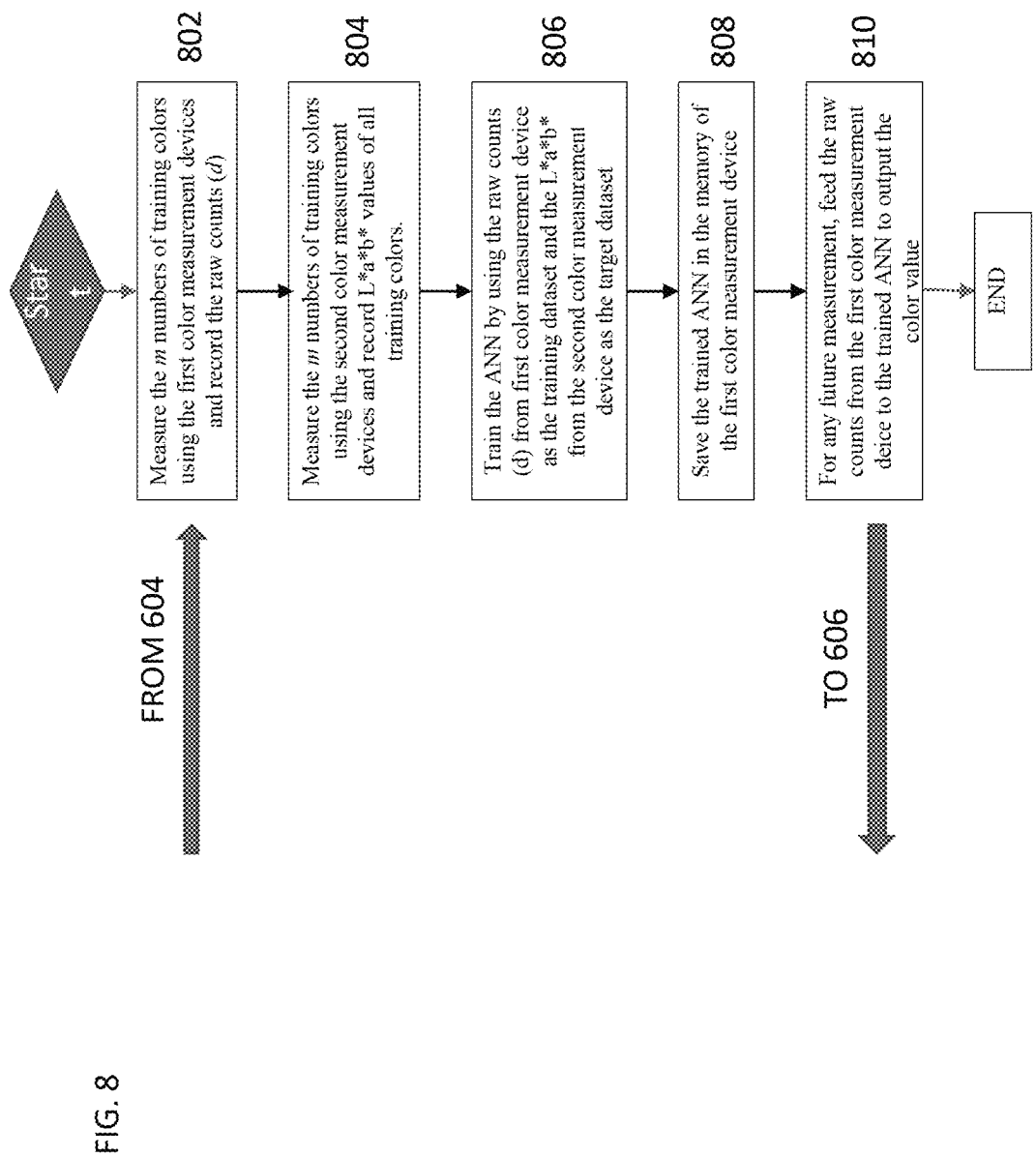
FIG. 8 is a flow diagram detailing training an ANN to generate color measurement values according to one implementation of the color measurement system described.
Figure 9:
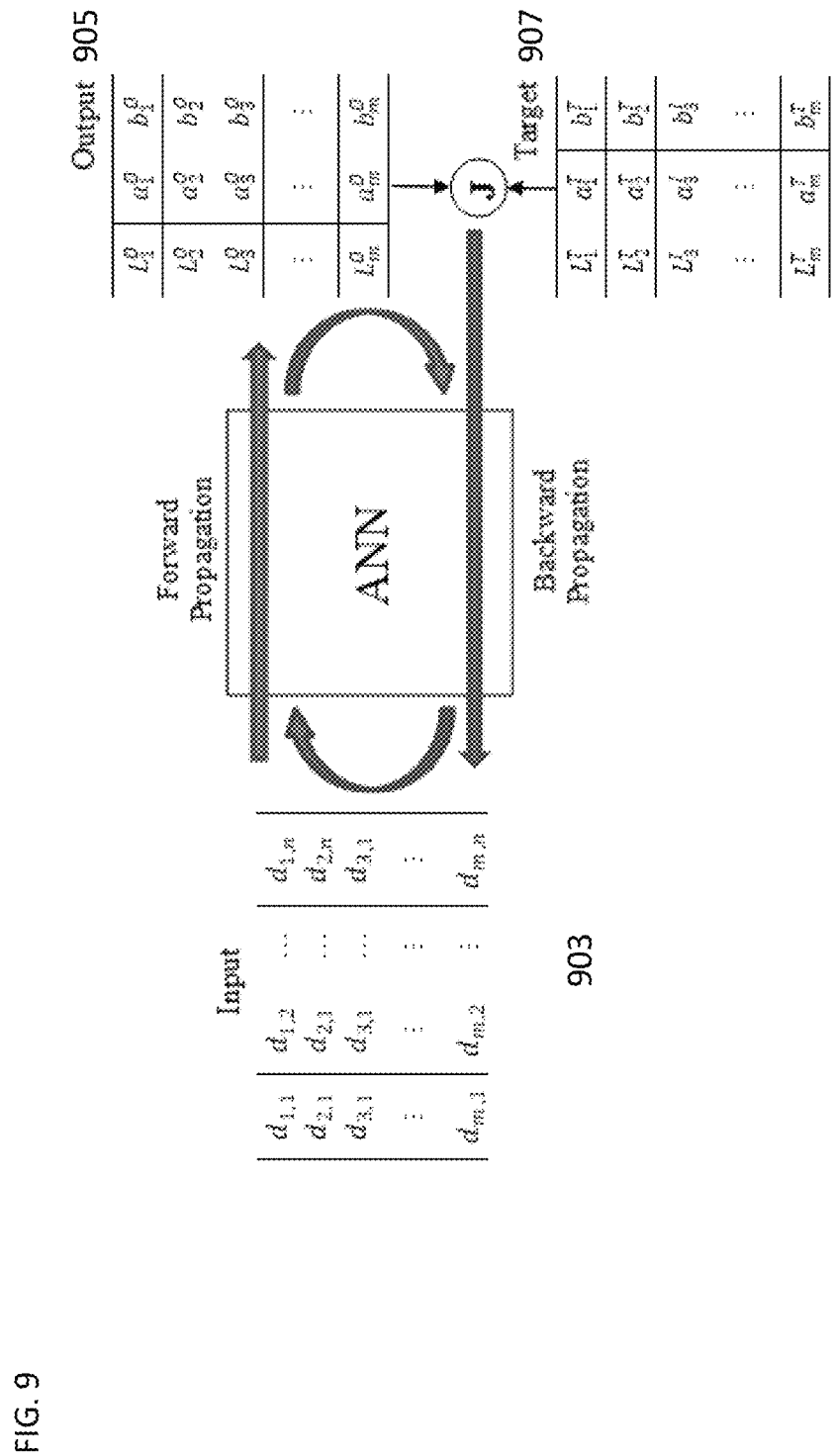
FIG. 9 is a graph detailing the ANN process according to one implementation of the color measurement system described.

Turning now to FIG. 8, the ANN can be trained to generate the desired output values by measuring a training dataset using the color measurement device 102, such as a smartphone. In one implementation, a trained ANN is generated as part of the overall measurement process (steps 602-608). However, in an alternative implementation, the ANN training process can be implemented separately from the color measurement process so as to allow for more efficient measurements of samples 103. In this arrangement, the ANN training process provided in steps 802-810 are implemented independently of the color measurement steps. For example, and similar to steps 202-210, the color measurement device 102 (such as a smartphone) is used to measure a collection of m training colors, as shown in step 802. As noted, the values used as inputs to the training process will be m×3 since only three raw counts are generated from each measurement of a different color. Furthermore, as noted in Eq. 1, the letter d in FIGS. 7 and 9 represents the raw counts from the color sensors of the color measurement device 102. As shown in FIG. 9, the input table that will be fed into the ANN for training has the dimension of m×n, where m represents the number of training colors while n represents the number of color sensors in the color measurement device. Each row represents one color measurement, while each column represents raw counts from one specific color sensor. For example, if the NCS color fandeck is used as the training color, m will be equal to 1950. If the color measurement device is a traditional colorimeter or imaging-based colorimeter, n will be equal to 3.

The same collection of colors (such as the NCS fandeck) are measured by the color measurement device that will provide the target data set. As shown in step 804, a second color measurement device, herein referred to as the target color measurement device, is used to measure m number of training colors and record L*a*b* values of each of the m training colors. For example, the target color measurement device can be selected from different makes and models of colorimeters, spectrophotometers or other devices used to measure color values and output color values in a particular color space. As further shown, the raw color measurements obtained in step 802 and the L*a*b* color values obtained from the target color measurement device in step 804 are provided to the processor 104 for evaluation by the ANN. For example, as shown in FIG. 9, a processor 104 is configured by the mapping module 310 to apply the values obtained in step 802 as the input data set 903 of the ANN. The data values obtained in step 804 are applied as the target data set 907 of the ANN. As shown in step 806, the processor 104 configured by mapping module 310 generates randomly initiated parameters to forward process the input table as in step 806. For example, the mapping module 310 configures the processor 104 to create an output table $L^O a^O b^O$ (905) with dimension of m×3. As described previously, here, the cost function J will be calculated as the difference between the output table 905 and the target table $L^T a^T b^T$ (907). Using this information, the mapping module 310 configures the processor 104 to backward propagate the cost function data to though the ANN to optimize the parameters of the ANN. The forward and backward propagation process is repeated until the minimum of J is located and the optimized parameters are saved. Once the optimized J value is obtained, the ANN is saved in a data storage location for further use as in step 808. For example, the trained ANN can be stored in a memory accessible by the processor 104 or color measurement device 102 for further use.

For instance, as noted in step 606, the trained ANN can be accessed by the color measurement device 102 to evaluate new raw measurements. As noted in step 810, the trained ANN can used to convert the raw counts obtained from the color measurement device 102 measurement device into L*a*b* values that will best match to the color measurement from the target color measurement device when measuring the same sample 103.

Due to the flexibility of the ANN provided, the target color space is not limited to Lab space. The target color space can be XYZ, LCH, Luv, et al. Here, the target data set would be changed so as to produce measurement values in the desired color space. Once the ANN is trained on a given color space, the raw measurements from the color measurement device 102 can be passed through the ANN and the corresponding desired color space values are generated.

In one of the embodiments, the color measurement device 102 is the smart phone with a forward-facing camera and a flash, while the second, or target color measurement device is a standalone colorimeter such as ColorReader product manufactured by Datacolor Inc. of Lawrenceville New Jersey.

Within the context of the present disclosure, "color tristimulus values" are understood to be values as defined by the CIE XYZ color space, e.g., in which Y represents luminance, Z is quasi-equal to blue, and X represents a mix of response curves chosen to be non-negative. CIEXYZ values are linear in light intensity and thus are amenable to matrix-based estimation from camera values. Furthermore, within the context of the present disclosure, "L*a*b* values" are understood to be values in the CIELAB color space, e.g., in which color is expressed as three values: L* for the lightness from black (0) to white (100); a* from green (−) to red (+); and b* from blue (−) to yellow (+). The CIELAB color space is considered more perceptually uniform than the CIEXYZ color space and is intended to approximate the perception of color by the human eye.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A color identification system for identifying a color of a sample object comprising:
   an image capture device configured to acquire an image of a sample;
   a processor having memory configured by program code executed thereby to:
   identify a pre-defined region of the image corresponding to a portion of the sample, calculate using values from the pre-defined region one set of RGB values by averaging the RGB values for the pre-defined region,
   apply the one set of averaged RGB values for the image as inputs to a pre-trained artificial neural network, the pre-trained artificial neural network (ANN) having at least an input and an output layer, wherein the output layer is configured to output color values in a pre-determined color space that is substantially similar to an expected output of a target color measurement device when the target color measurement device is used to measure the sample;
   generate, using the artificial neural network, an output in the predetermined color space values wherein the output corresponds to one or more color values of the sample; and
   provide the output to one or more display devices.

2. The color identification system of claim 1, wherein the output color space is selected from, L*a*b*, XYZ, LCH, Luv or CIELAB color spaces.

3. The color identification system of claim 1, wherein the target color measurement device is a colorimeter.

4. The system of claim 1, wherein the one or more display devices is a display of a mobile computing device.

5. The system of claim 4, where in the image capture device and the processor are integrated into the mobile computing device.

6. The system of claim 4, wherein the image capture device is remote from the processor and is configured to communicate with the processor via one or more wireless communication protocols.

7. The system of claim 4, wherein the mobile computing device is a smart phone.

8. The color identification system of claim 1, wherein the pre-trained neural network is trained by:
   receiving, by a training processor, an input data set of color values extracted from a pre-defined portion of a plurality of images captured of a training set of colors by the image capture device image;
   receiving, by the training processor, target data set of color values of obtained by measuring the training set of colors using a target color measurement device;
   applying, by the training processor, the input data set to an untrained neural network to generate an initial output data set, wherein the neural network includes one or more variable parameters that alter the output values generated by the neural network;
   comparing, by the training processor, the output data set to the target data set;
   adjusting, by the training processor, the one or more variable parameters to minimize the difference between the target set and the output set when the input data set is applied to the artificial neural network; and
   storing, by the training processor, the artificial neural network once the minimum difference between the output data set and the target data set has been obtained.

9. The color identification system of claim 8, wherein the target color measurement device is a spectrophotometer or colorimeter.

10. The color identification system of claim 8, wherein the input data set is in RGB color values.

11. The color identification system of claim 1, wherein the target data set provides color values in a pre-determined color space.

12. The system of claim 11, wherein the pre-determined color space is one of L*a*b*, CIE or XYZ color space.

13. The system of claim 1, wherein RGB values are obtained by a processor configured to calculate a red channel average raw count, a green channel average raw count, and a blue channel average raw count for the pixels within the pre-defined range of the image.

14. The color identification system of claim 1, wherein the target color measurement device has more color measurement channels than the image capture device.

15. A method, comprising:
capturing of an image of a sample using an image capture device;
identify a pre-defined region of the image corresponding to a portion of the sample, calculate using values from the pre-defined region one set of RGB values by averaging the RGB values for the pre-defined region,
applying, using one or more suitably configured processors, the one set of averaged RGB color values as inputs to a pre-trained artificial neural network, said artificial neural network having an at least an input and an output layer, wherein the output layer is configured to output color values in a pre-determined color space that is substantially similar to an expected output of a target color measurement device when the target color measurement device is used to measure the sample;
generating using the artificial neural network, using one or more suitably configured processor, an output value in the predetermined color space characterizing the one or more color values of the sample; and
providing, using one or more suitably configured processor, the output to one or more display devices.

16. A method of color identification comprising:
receiving, by one or more training processors, an input data set of color values corresponding a plurality of single set RGB values, where each of the single set RGB values is obtained from a pre-defined region of a plurality of images, where the single set RGB values for each of the plurality of images was calculated by averaging the values within the pre-determined region of the plurality of images captured of a training set of colors by an image capture device;
receiving, by the one or more training processors, a target data set of color values obtained by measuring the training set of colors using a target color measurement device wherein the image capture device is different from the target color measurement device;
applying the input data set to an untrained neural network to generate an initial output data set, wherein the neural network includes one or more variable parameters that alter the output values generated by the neural network;
comparing, by the one or more training processors, the output data set to the target data set;
adjusting, by the one or more training processors, the one or more variable parameters to minimize the difference between the target set and the output set when the input data set is applied to the artificial neural network; and
outputting, by one or more training processors, the artificial neural network to a data storage location once the minimum difference between the output data set and the target data set has been obtained.

* * * * *